(12) United States Patent
Norimoto et al.

(10) Patent No.: US 8,645,713 B2
(45) Date of Patent: Feb. 4, 2014

(54) ENCRYPTING METHOD, RECORDING MEDIUM OF ENCRYPTING PROGRAM, DECRYPTING METHOD, AND RECORDING MEDIUM OF DECRYPTING PROGRAM

(75) Inventors: Eisuke Norimoto, Yokohama (JP); Masahiro Kataoka, Tama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/422,312

(22) Filed: Mar. 16, 2012

(65) Prior Publication Data

US 2012/0246485 A1     Sep. 27, 2012

(30) Foreign Application Priority Data

Mar. 22, 2011  (JP) ................................. 2011-063406

(51) Int. Cl.
*G06F 12/14*     (2006.01)
(52) U.S. Cl.
USPC ............................... 713/189; 380/29; 380/28
(58) Field of Classification Search
None
See application file for complete search history.

(56) References Cited

U.S. PATENT DOCUMENTS

| | | | |
|---|---|---|---|
| 7,071,848 B1* | 7/2006 | Khu | 341/51 |
| 2003/0091241 A1* | 5/2003 | Morihara et al. | 382/233 |
| 2007/0253549 A1* | 11/2007 | Celikkan et al. | 380/42 |
| 2007/0283358 A1 | 12/2007 | Kasahara et al. | |
| 2011/0051927 A1* | 3/2011 | Murray et al. | 380/28 |

FOREIGN PATENT DOCUMENTS

| | | |
|---|---|---|
| JP | 10-214195 | 8/1998 |
| JP | 2007-328415 | 12/2007 |

* cited by examiner

*Primary Examiner* — Andrew L Nalven
*Assistant Examiner* — Mohammed Waliullah
(74) *Attorney, Agent, or Firm* — Staas & Halsey LLP (57) ABSTRACT

An encrypting method including encrypting a first data segment of encryption target data on the basis of first key information, generating second key information on the basis of the first data segment by using a predetermined algorithm, and encrypting a second data segment of the encryption target data, which is different from the first data segment, on the basis of the second key information.

18 Claims, 10 Drawing Sheets

ENCRYPTING METHOD, RECORDING MEDIUM OF ENCRYPTING PROGRAM, DECRYPTING METHOD, AND RECORDING MEDIUM OF DECRYPTING PROGRAM

CROSS-REFERENCE TO RELATED APPLICATIONS

This application is based upon and claims the benefit of priority of the prior Japanese Patent Application No. 2011-063406, filed on Mar. 22, 2011, the entire contents of which are incorporated herein by reference.

FIELD

The embodiments discussed herein are related to an encrypting method, a medium storing an encrypting program, a decrypting method, a medium storing a decrypting program, a decrypting apparatus, and a server apparatus.

BACKGROUND

Hitherto, devices that encrypt digital content and transmit the encrypted content have been available. For example, such a device in related art compresses digital content. The device then encrypts the compressed digital content by using a single encryption key or the like. The device then transmits the encrypted digital content to a user terminal, such as a PC (personal computer), a mobile phone, or the like. Examples of the digital content include a moving image, music, and a book. The reason why the digital content is encrypted is, for example, to protect copyrights.

Upon receiving the digital content, the user terminal decrypts the digital content. The user terminal then decompresses the decrypted digital content so as to enable use of the digital content.

However, for example, information of the encryption key, used for the encryption could be guessed. More specifically, in the related art, for example, since digital content is typically encrypted with a single encryption key, the encryption key is more likely to be deciphered from the overall encrypted digital content than a case in which the digital content is encrypted with multiple encryption keys. There is also a scheme in which digital content is divided into multiple pieces of data, each having a few kilobytes to tens of kilobytes, and the divided pieces of data are encrypted with respective different encryption keys. Such a scheme, however, involves management of the encryption keys for the respective divided pieces of data.

SUMMARY

According to an aspect of the invention, an encrypting method including encrypting a first data segment of encryption target data on the basis of first key information, generating second key information on the basis of the first data segment by using a predetermined algorithm, and encrypting a second data segment of the encryption target data, which is different from the first data segment, on the basis of the second key information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Figure 1:
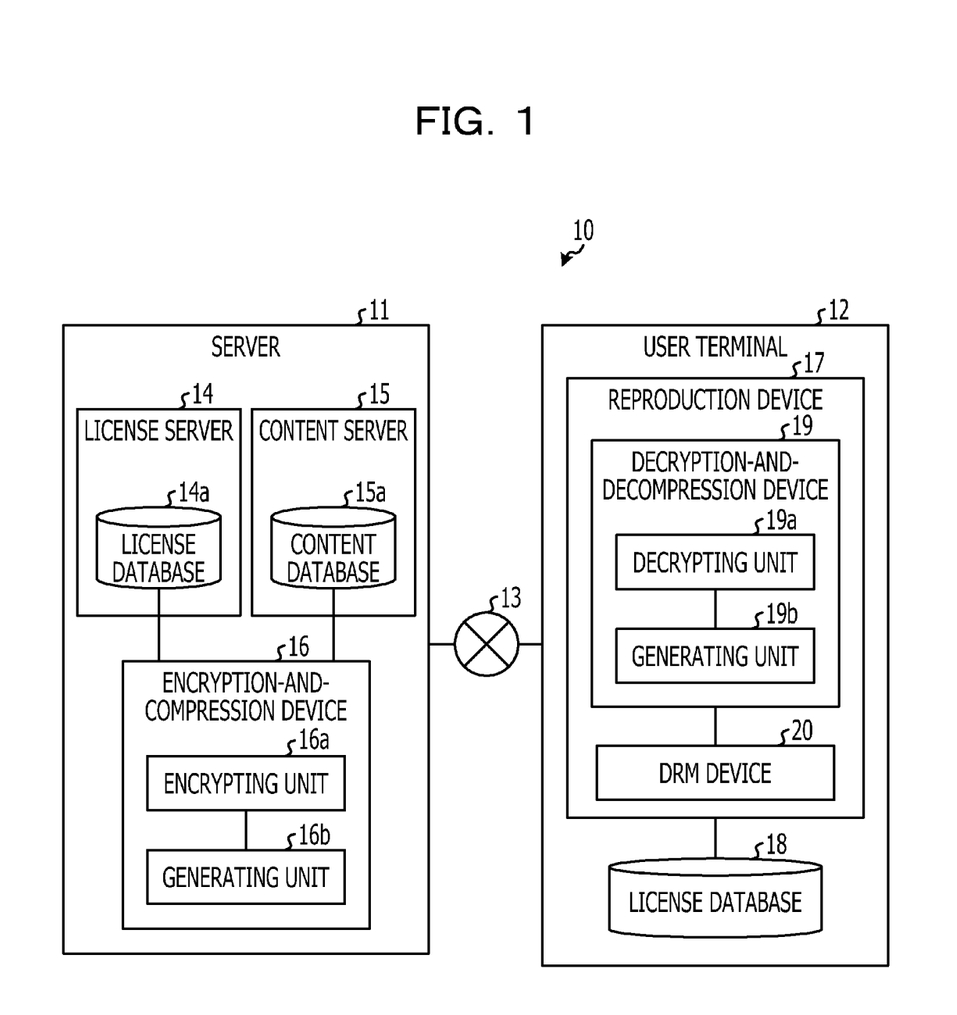
FIG. 1 illustrates one example of the configuration of a system.

A system according to a first embodiment will be explained below. FIG. 1 is a block diagram illustrating one example of the configuration of a system according to a first embodiment. A system 10 according to the present embodiment includes a server 11 and a user terminal 12. The server 11 and the user terminal 12 are connected so as to allow data transmission and reception. In the example of FIG. 1, the server 11 and the user terminal 12 are connected over an Internet 13. The server 11 and the user terminal 12 may be connected wirelessly. The server 11 compresses data of content, encrypts the compressed content data, and transmits the encrypted content data to the user terminal 12. The user terminal 12 decrypts the received content data, decompresses the decrypted content data, and reproduces the decompressed content data.

The server 11 includes a license server 14, a content server 15, and an encryption-and-compression device 16. The encryption-and-compression device is also referred to as an "encrypting device".

The license server 14 generates a key for encryption. The license server 14 has a license database 14a. For example, the license server 14 generates key information, which is information of keys for encrypting corresponding pieces of content registered in the content server 15. The license server 14 registers the generated key information into the license database 14a.

The content server 15 registers content to be supplied to the user terminal 12. The content server 15 has a content database 15a. For example, the content server 15 obtains various types of content of moving images, music, books, and so on from an external apparatus (not illustrated) and registers the obtained content into the content database 15a. The content server 15 also registers, in the content database 15a, the content data compressed and encrypted by the encryption-and-compression device 16.

The encryption-and-compression device 16 has an encrypting unit 16a and a generating unit 16b.

The encrypting unit 16a encrypts a first data segment of content data to be encrypted, on the basis of first key information. For example, upon receiving a content-supplying instruction from the user terminal 12 over the Internet 13, the encrypting unit 16a obtains, from the content database 15a, content data corresponding to content indicated by the instruction. The encrypting unit 16a also obtains, from the license database 14a, key information corresponding to the obtained content data.

The encrypting unit 16a may use LZ77 to compress the content data as a data compression algorithm, for example. A description will now be given in conjunction with a specific example. Using the LZ77 data compression algorithm, the encrypting unit 16a applies a sliding window, which has a search buffer and a look-ahead buffer, to a data segment at the beginning of the content data. When the content data in the search buffer has data that matches a symbol of the content data starting at the beginning of the look-ahead buffer, the encrypting unit 16a generates a pointer used for compression with respect to the matched longest data segment of the data in the search buffer. The pointer includes information of a position where the data in the search buffer of the sliding window appears and information of the length of the data. The encrypting unit 16a outputs the generated pointer to a buffer. This buffer may be provided in the encryption-and-compression device 16. The encrypting unit 16a shifts the sliding window by an amount corresponding to the matched longest data segment.

When the content data in the search buffer does not have data that matches a symbol of the content data starting at the beginning of the look-ahead buffer, the encrypting unit 16b outputs a predetermined number of pieces of the data in the look-ahead buffer to a buffer without compressing the data. The data output to the buffer when the content data in the search buffer does not have data that matches a symbol of the content data staring at the beginning of the look-ahead buffer may also be called a "literal byte". After outputting the data to the buffer, the encrypting unit 16a shifts the sliding window by an amount corresponding to the output data.

When predetermined block length of compressed data (block 1, a first data segment) is generated by the compression processing, the generating unit 16b performs processing as explained below. That is, the generating unit 16b calculates a hash value $X_1$ of the data in the search buffer of the sliding window. One example of a hash function used when the generating unit 16b generates the hash value is SHA (Secure Hash Algorithm)-2. The length of the hash value generated by the generating unit 16b is, for example, 128 bits, 192 bits, or 256 bits. The hash function used when the generating unit 16b generates the hash value is the same as the hash function used when the decryption-and-decompression device 19 (described below) generates hash values. The generating unit 16b couples the hash value $X_1$ and content key information Kc to calculate a value $X_2$ (=$X_1$+Kc). For example, symbol "+" indicates plus. Next, the generating unit 16b calculates a hash value X of the value $X_2$.

When the size of the buffer reaches a predetermined block length, the encrypting unit 16a retrieves the data (block 1, the first data segment), whose size is the predetermined block size, from the buffer and encrypts the retrieved data by using the content key information as an encryption key. Examples of an algorithm for the encryption performed by the encrypting unit 16a include symmetric-key cryptography such as DES (data encryption standard) and AES (advanced encryption standard). The predetermined block length is a unit for encryption. The predetermined block length may be, for example, 128 bits. The algorithm for the encryption performed by the encrypting unit 16a is the same as an algorithm for encryption (explained below) and corresponds to an algorithm for decryption performed by the decryption-and-decompression device 19 (explained below). The encrypting unit 16a sends the encrypted data to the content server 15. As a result, the encrypted data is registered into the content database 15a. The encrypting unit 16a performs processing for sending the thus-encrypted data to the content server 15 only once. The encrypting unit 16a may also transmit the encrypted data to the user terminal 12 over the Internet 13. In this case, the encrypting unit 16a performs processing for transmitting the encrypted data to the user terminal 12, for example, only once.

By using a predetermined algorithm, the generating unit 16b generates second key information on the basis of the content key information and the data in the search buffer of the sliding window, the data being a data segment of the content data.

A description will now be given in conjunction with a specific example. Each time the predetermined block length of compressed data is generated by the encrypting unit, the generating unit 16b performs processing as explained below. That is, the generating unit 16b calculates a hash value $X_1$ of the data in the search buffer of the sliding window. The generating unit 16b couples the hash value $X_1$ and the content key information Kc to calculate a value $X_2$ (=$X_1$+Kc). Next, the generating unit 16b calculates a hash value X of the value $X_2$. The hash value X generated by the generating unit 16b serves as an encryption key used when the encrypting unit 16a performs encryption. Since the generating unit 16b calculates the hash value X each time the predetermined block length of compressed data is generated, the value of the hash value X that the encrypting unit 16a uses as the encryption key varies dynamically.

On the basis of the second key information, the encrypting unit 16a encrypts a second data segment of the content data, the second data segment being different from the first data segment encrypted by the encrypting unit 16a. For example, the encrypting unit 16a encrypts the content data by using, as an encryption key, the hash value X generated by the generating unit 16b.

A description will now be given in conjunction with a specific example. Each time the sliding window is shifted in the content data, the encrypting unit 16a performs processing, as explained below, by using the LZ77 data compression algorithm. When the content data in the search buffer has data that matches a symbol of the content data starting at the beginning of the look-ahead buffer, the encrypting unit 16a generates a pointer used for compression with respect to the matched longest data segment of the data in the search buffer. The encrypting unit 16a outputs the generated pointer to a buffer. The encrypting unit 16a shifts the sliding window by an amount corresponding to the matched longest data segment.

When the content data in the search buffer does not have data that matches a symbol of the content data starting at the beginning of the look-ahead buffer, the encrypting unit 16a outputs a predetermined number of pieces of the data in the look-ahead buffer to a buffer without compressing the data.

When the size of the buffer reaches a predetermined block length, the encrypting unit 16a retrieves the predetermined block length of data, output to the buffer, from the buffer and encrypts the retrieved data by using, as an encryption key, the hash value X generated based on the encrypted block by the generating unit 16b. The encrypting unit 16a sends the encrypted data to the content server 15. As a result of the processing explained above, the encrypted data is registered into the content database 15a. The encrypting unit 16a repeatedly performs processing for sending the thus-encrypted data to the content server 15. The encrypting unit 16a may also transmit the encrypted data to the user terminal 12 over the Internet 13. The encrypting unit 16a repeatedly performs processing for transmitting the encrypted data to the user terminal 12. The encryption key used when the encrypting unit 16a performs encryption varies dynamically in accordance with a content-data segment to be encrypted. Thus, it is possible to reduce guessing of the key information, compared to a case in which the content data is encrypted with a single encryption key.

Figure 2:
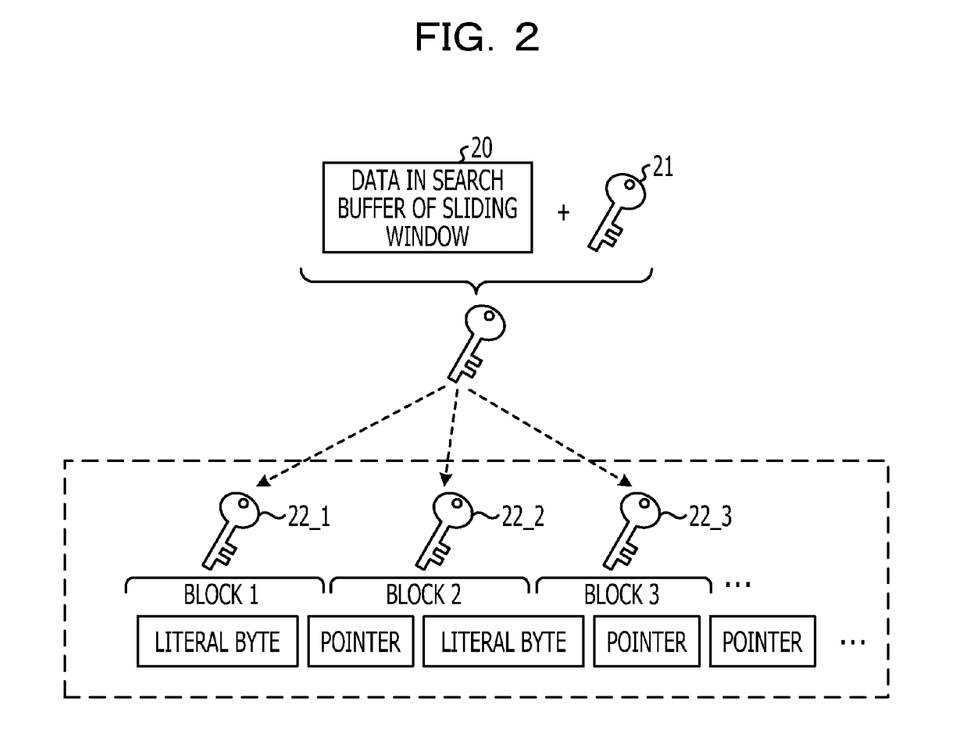
FIG. 2 illustrates processing performed by an encryption-and-compression device.

FIG. 2 schematically illustrates processing performed by the encryption-and-compression device. In the example of FIG. 2, on the basis of data 20 in the search buffer of the sliding window and content key information 21, the encryption-and-compression device 16 generates dynamic keys 22_1, 22_2, and 22_3, which serve as dynamic encryption keys for encrypting literal bytes and pointers for corresponding blocks 1, 2, and 3. Since the data 20 in the search buffer of the sliding window varies dynamically, the dynamic key generated for each block also varies dynamically. The dynamic keys 22_2, used to encryption of the block 2, is generated based on the content key information 21 and data 20, which is left in slide window after compression processing of the block 1.

Referring back to FIG. 1, the user terminal 12 includes a reproduction device 17 and a license database 18. The key information, which is information of keys for encrypting corresponding pieces of content, is registered in the license database 18. The pieces of key information registered in the license database 18 are the same as the pieces of key information registered in the license database 14a explained above. Examples of the user terminal 12 include a PC (personal computer) and a mobile phone.

The reproduction device 17 includes a decryption-and-decompression device 19 and a DRM (digital rights management) device 20. Upon receiving a content-using instruction from a user of the user terminal 12 via an input unit, such as a keyboard and/or a mouse (which are not illustrated), the DRM device 20 issues a content-supplying instruction to the server 11 over the Internet 13. Upon receiving the content transmitted from the server 11, the DRM device 20 obtains, from the license database 18, the key information corresponding to the received content and sends the obtained key information to the decryption-and-decompression device 19. The DRM device 20 reproduces the content data decompressed and decrypted by the decryption-and-decompression device 19.

The decryption-and-decompression device 19 has a decrypting unit 19a and a generating unit 19b. The decryption-and-decompression device 19 is also referred to as a "decrypting device".

On the basis of the first key information (the content key information), the decrypting unit 19a decrypts the first data segment of the content data to be decrypted, the content data being transmitted from the server 11.

A description will now be given in conjunction with a specific example. The decrypting unit 19a decompresses the decrypted first data segment by using a decompressing algorithm with the sliding window. The decrypting unit 19a calculates a hash value $X_1$ of the data in the search buffer of the sliding window. One example of a hash function used when the generating unit 19b generates the hash value is SHA-2 used when the generating unit 16b and the second encrypting unit 16c explained above generate the hash values. The generating unit 19b couples the hash value $X_1$ and content key information Kc to calculate a value $X_2$ (=$X_1$+Kc). Next, the generating unit 19b calculates a hash value X of the value $X_2$. The value of the hash value X varies according to the shift of the sliding window. The decrypting unit 19a uses the hash value X as a decryption key to decrypt the block next to the decrypted block of the received content data. The decrypting unit 19a then sends, to the DRM device 20, a data segment included in the decrypted data and not indicated by the pointer. With respect to the data segment included in the decrypted data and indicated by the pointer, the decrypting unit 19a converses the data in the search buffer of the sliding window on the basis of the data appearance position and the data length included in the pointer and sends the conversed data to the DRM device 20. The DRM device 20 reproduces the received data. The decrypting unit 19a shifts the sliding window by an amount corresponding to the data sent to the DRM device 20.

By using a predetermined algorithm, the generating unit 19b generates second key information on the basis of the first data segment and the first key information. For example, each time the predetermined block length of data is decompressed by using the LZ77 data compression algorithm, the generating unit 19b performs processing as explained below. The generating unit 19b calculates a hash value $X_1$ of the data in the search buffer of the sliding window. The generating unit 19b couples the hash value $X_1$ and the content key information Kc to calculate a value $X_2$ (=$X_1$+Kc). Next, the generating unit 19b calculates a hash value X of the value $X_2$. The value of the hash value X varies according to the shift of the sliding window.

The decrypting unit 19a decrypts the second data segment on the basis of the second key information. For example, the decrypting unit 19a uses the hash value X, calculated by the generating unit 19b, as a decryption key to decrypt a block corresponding to the received content data. The decrypting unit 19a then sends, to the DRM device 20, a data segment included in the decrypted data and not indicated by the pointer. With respect to the data segment included in the decrypted data and indicated by the pointer, the decrypting unit 19a converses the data in the search buffer of the sliding window on the basis of the data appearance position and the data length included in the pointer and sends the conversed data to the DRM device 20. The decrypting unit 19a shifts the sliding window by an amount corresponding to the data sent to the DRM device 20.

The license database 14a, the content database 15a, and the license database 18 are stored in storage devices, for example, hard disks, optical disks, or semiconductor memory devices such as flash memories. The storage devices in which the license database 14a, the content database 15a, and the license database 18 are stored are not limited to those types of storage device, and may be RAMs (random access memories) or ROMs (read only memories).

Each of the server 51 and the user terminal 52 may include an integrated circuit, such as an ASIC (application specific integrated circuit) or FPGA (field programmable gate array). Each of the server 51 and the user terminal 52 may also include an electronic circuit, such as a CPU (central processing unit) or an MPU (micro processing unit). The CPU and the MPU of the server is an example of a processor which reads out the encrypting program from a storage device or ROMs. The processor of the server 51 carries out operations processed by the encryption-and-compression device 16 on the basis of a decrypting program and controls other hardware. For example, the processor of the server 51 executes encrypting process by using the integrated circuit such as ASIC or FPGA. The CPU and the MPU of the user terminal 52 is an example of a processor which reads out the decrypting program from a storage device or ROMs. The processor of the user terminal 52 carries out operations processed by the decryption-and-decompression device 19 on the basis of a decrypting program and controls other hardware. For example, the processor of the user terminal 52 executes decrypting process by using the integrated circuit such as ASIC or FPGA.

Figure 3:
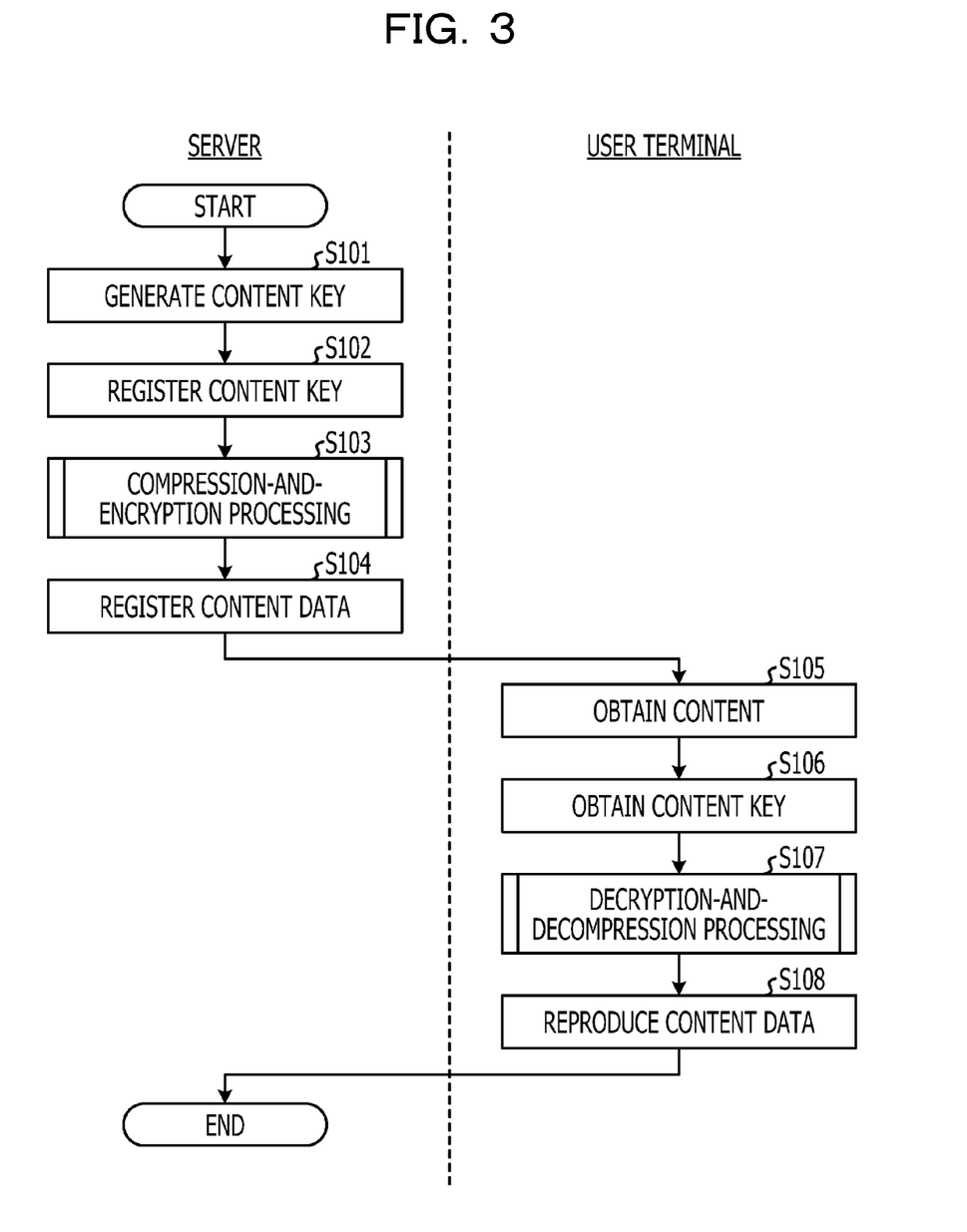
FIG. 3 illustrates a sequence diagram of the system.

A flow of the processing performed by the system 10 according to the present embodiment will be explained next. FIG. 3 is a sequence diagram of the system according to the first embodiment.

FIG. 3 is a sequence diagram of the system according to the first embodiment. As illustrated in FIG. 3, in S101, the license server 14 generates key information corresponding to content indicated by a content-supplying instruction. In S102, the license server 14 registers the generated key information into the license database 14a. In S103, the encryption-and-compression device 16 executes compression-and-encryption processing. The compression-and-encryption processing is described below. In S104, the content server 15 registers the compressed and encrypted content data into the content database 15a.

In S105, the DRM device 20 obtains content from the server 11. In S106, the DRM device 20 obtains, from the license database 18, key information corresponding to the content and sends the obtained key information to the decryption-and-decompression device 19. In S107, the decryption-and-decompression device 19 executes decryption-and-decompression processing. In S108, the DRM device 20 reproduces the content data decompressed and decrypted by the decryption-and-decompression device 19.

Figure 4:
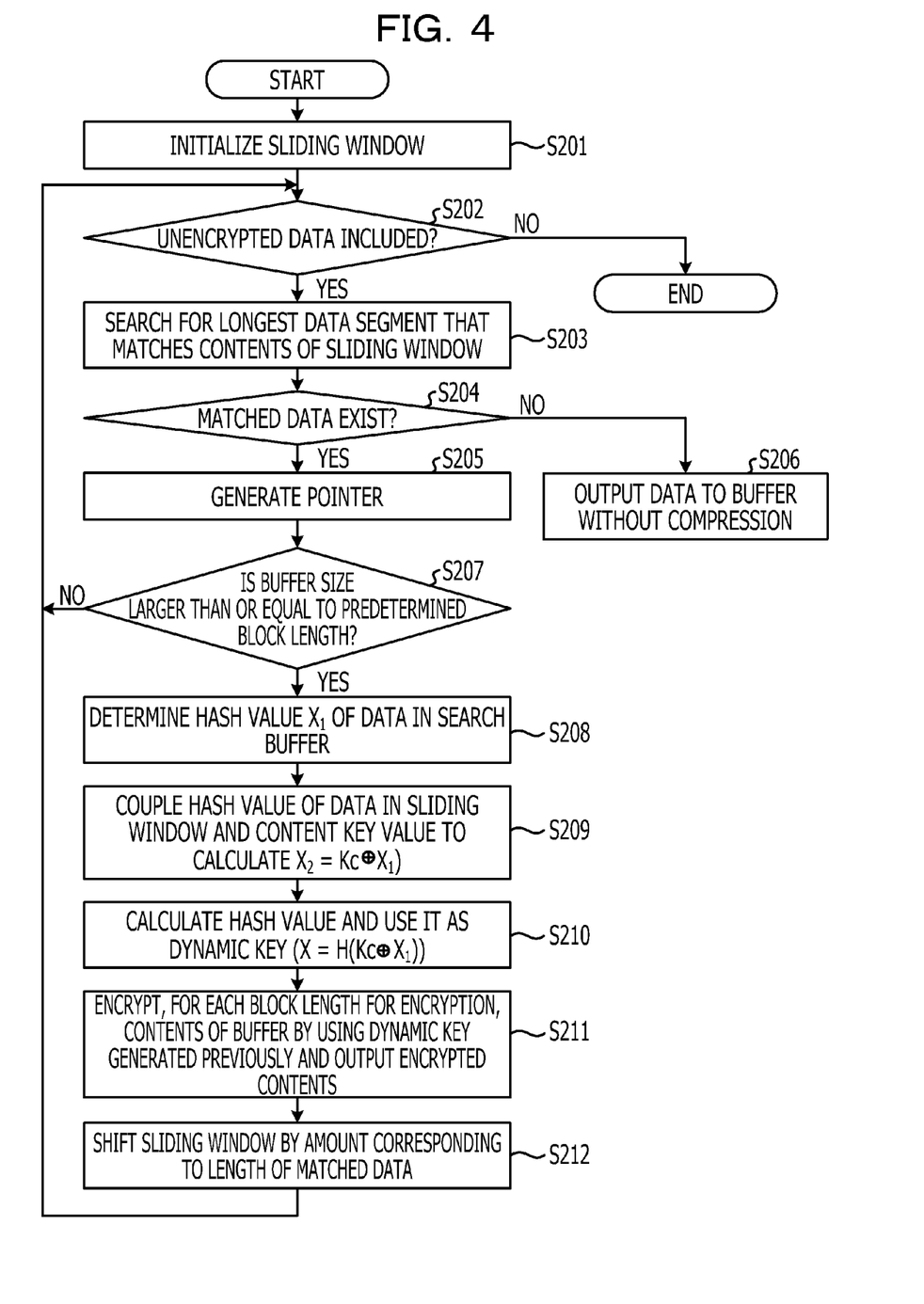
FIG. 4 illustrates a flowchart of compression-and-encryption processing.

A flow of the processing performed by the encryption-and-compression device 16 in the present embodiment will be explained next. FIG. 4 is a flowchart illustrating a procedure of compression-and-encryption processing according to the first embodiment. The compression-and-encryption processing may be executed at any appropriate timing. For example, the compression-and-decryption processing may be executed when the server 11 receives a content-supplying instruction.

As illustrated in FIG. 4, in S201, the encrypting unit 16a initializes the sliding window. In S202, the encrypting unit 16a determines whether or not unencrypted data is included in the obtained content data. When no unencrypted data is included (Negative in S202), the processing ends.

On the other hand, when unencrypted data is included (Affirmative in S202), in S203, the encrypting unit 16a searches for, in the content data in the search buffer, data that matches a symbol of content data starting at the beginning of the look-ahead buffer. In S204, the encrypting unit 16a determines whether or not data that matches a symbol exists. When data that matches a symbol of the content data starting at the beginning of the look-ahead buffer exists (Affirmative in S204), the process proceeds to S205 in which the encrypting unit 16a generates a pointer for compression with respect to the matched longest data segment of the data in the search buffer. In S206, the first encrypting unit 16a outputs the generated pointer to a buffer.

On the other hand, when data that matches a symbol of the content does not exist (Negative in S204), the process proceeds to S206 in which the encrypting unit 16a outputs a predetermined number of pieces of the data in the look-ahead buffer to the buffer without compressing the data.

In S207, the encrypting unit 16a determines whether or not the size of the buffer is larger than or equal to a predetermined block length. When the size of the buffer is smaller than the predetermined block length (Negative in S207), the encrypting unit 16a shifts the slide window by an amount corresponding to the length of the matched longest data segment and the process returns to S202. On the other hand, when the size of the buffer is larger than or equal to the predetermined block length (Affirmative in S212), the generating unit 16b calculates a hash value X1 of the data in the search buffer of the slide window (S208). IN S209, the generating unit 16b couples the hash value X1 and content key information Kc to calculate a value X2 (=X1+Kc). In S210, the generating unit 16b calculates a hash value X of the value X2. The process proceeds to S211 in which the encrypting unit 16a retrieves the data, output to the buffer, from the buffer, encrypts the retrieved data by using the hash value X as an encryption key and then sends the encrypted data to the content server 15. Thereafter, the encrypting unit 16a shifts the slide window by an amount corresponding to the length of the matched longest data segment (S212) and the process returns to S202. As a result of the processing explained above, content data to be transmitted to the user terminal 12 is generated.

Figure 5:
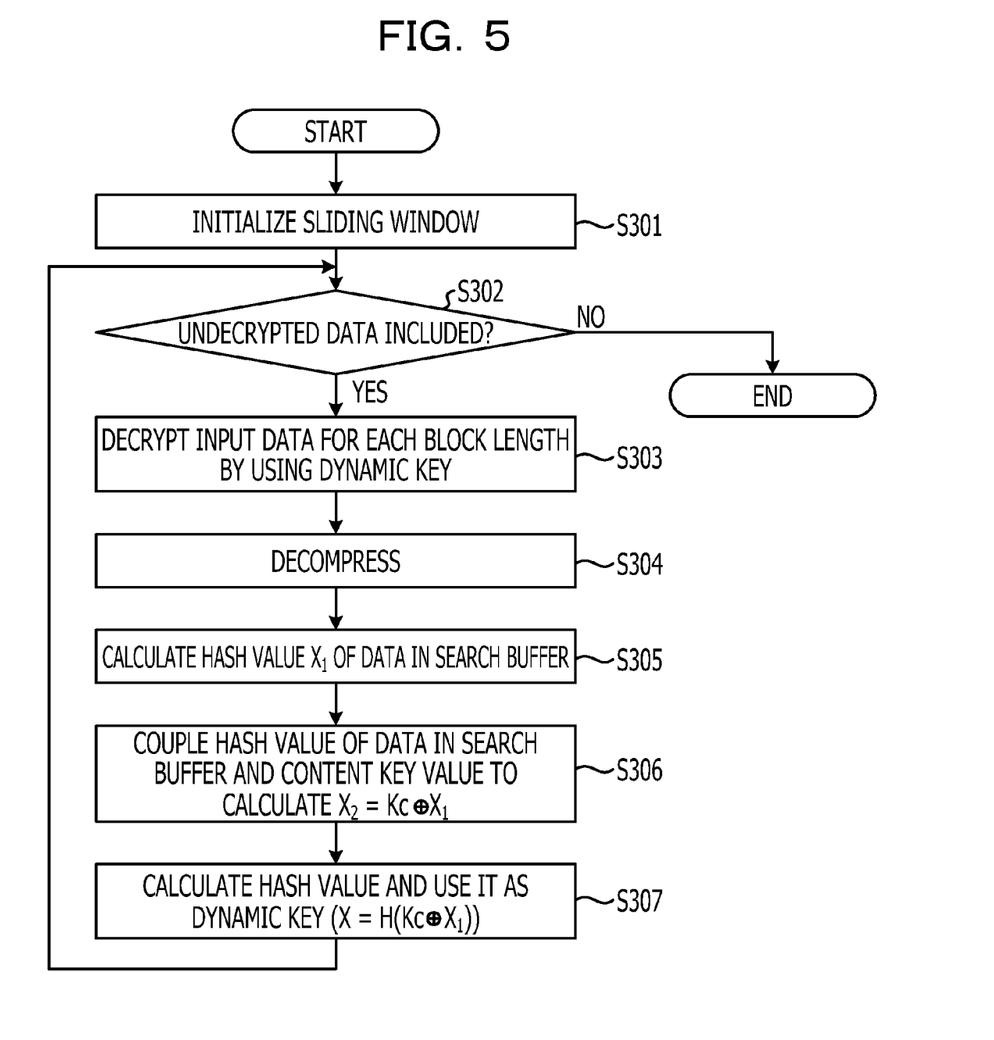
FIG. 5 illustrates a flowchart of decryption-and-decompression processing.

A flow of the processing performed by the decryption-and-decompression device 19 in the present embodiment will be explained next. FIG. 5 is a flowchart illustrating a procedure of decryption-and-decompression processing according to the first embodiment. The decryption-and-decompression processing may be executed at any appropriate timing. For example, the decryption-and-decompression may be executed when the user terminal 12 receives the content data.

As illustrated in FIG. 5, in S301, the decrypting unit 19a initializes the sliding window. In S302, the decrypting unit 19a determines whether or not undecrypted data is included in the received content data. When no undecrypted data is included (Negative in S302), the processing ends.

On the other hand, when decrypted data is included (Affirmative in S302), the decrypting unit 19a uses the hash value X as a decryption key to decrypt an undecrypted block that is included in the received content data and that is the closest to the beginning of the content data (S303). The decrypting unit 19a then sends, to the DRM device 20, a data segment included in the decrypted data and not indicated by the pointer. In S304, with respect to the data segment included in the decrypted data and indicated by the pointer, the first decrypting unit 19a converses the data on the basis of the data appearance position and the data length included in the pointer and sends the conversed data to the DRM device 20. The generating unit 19b calculates a hash value X1 of the data in the search buffer of the sliding window (S305). The generating unit 19b couples the hash value X1 and the content key information Kc to calculate a value X2 (=X1+Kc) (S306). In S307, the generating unit 19b calculates a hash value X of the value X2. Thereafter, the process returns to S302.

As explained above, on the basis of first key information, the encryption-and-compression device 16 in the present embodiment encrypts a first data segment of the data to be encrypted. On the basis of the first data segment and the first key information, the encryption-and-compression device 16 in the present embodiment generates second key information by using a predetermined algorithm. Subsequently, on the basis of the second key information, the encryption-and-compression device 16 in the present embodiment encrypts a second data segment of the data to be encrypted, the second data segment being different from the first data segment. As explained above, the first key information and the second key information vary dynamically in accordance with a data segment of the content data to be encrypted. Thus, the encryption-and-compression device 16 in the present embodiment makes it possible to reduce guessing of the key information, compared to a case in which the content data is encrypted with a single encryption key.

The encryption-and-compression device 16 in the present embodiment also compresses the second data segment by using the sliding window and encrypts the compressed second data segment on the basis of the data in the sliding window, which is used in the compression processing of the block 1, and the key information. Accordingly, the encryption-and-compression device 16 in the present embodiment can perform the compression and the encryption by a single operation, thus making it possible to achieve efficient compression and encryption in terms of the amount of time and the amount of resource. For the same reason, the decryption-and-decompression device 19 in the present embodiment can perform the decompression and the decryption by a single operation, thus making it possible to achieve efficient decompression and decryption in terms of the amount of time and the amount of resource. Since the decryption-and-decompression device 19 in the present embodiment can perform the decompression and the decryption by a single operation, raw data can be locally decompressed and the risk of information leak can be reduced. Furthermore, the size of memory areas used in the encryption-and-compression processing is conserved with or without increasing size of the content data.

Also, on the basis of second data segment of the data to be encrypted and the second key information, the encryption-and-compression device 16 in the present embodiment generates third key information by using a predetermined algorithm. On the basis of the third key information, the encryption-and-compression device 16 in the present embodiment encrypts a third data segment of the data to be encrypted. Accordingly, the encryption-and-compression device 16 in the present embodiment can encrypt the data with changing the pieces of key information corresponding to data segments (the positions thereof) of the data.

The decryption-and-decompression device 19 in the present embodiment also decrypts the first data segment on the basis of the first key information. On the basis of the first data segment and the first key information, the decryption-and-decompression device 19 in the present embodiment generates the second key information by using a predetermined algorithm. The decryption-and-decompression device 19 in the present embodiment also decrypts the second data segment on the basis of the second key information. Thus, the decryption-and-decompression device 19 in the present embodiment can decrypt encrypted data decrypt the encrypted data of which guessing of the key information is reduced. And, an encrypting/decrypting algorithm for the first data segment may be different from an encrypting/decrypting algorithm for other data segments (such as the second data segment and the third data segment). In the encrypting processing, without decryption processing for the first data segment, decryption processing for other data segment (except for the first data segment) does not executed. Therefore, if a low cost encryption algorithm used for the other data segment, difficulty of encrypted data is sustained by using a high cost encryption algorithm for the first data segment.

Although a case in which LZ77 is used has been explained above in the first embodiment by way of example, the data compression algorithm for the devices disclosed herein is not limited thereto. Accordingly, a case in which LZ78 is used will be explained in the second embodiment by way of example.

Figure 6:
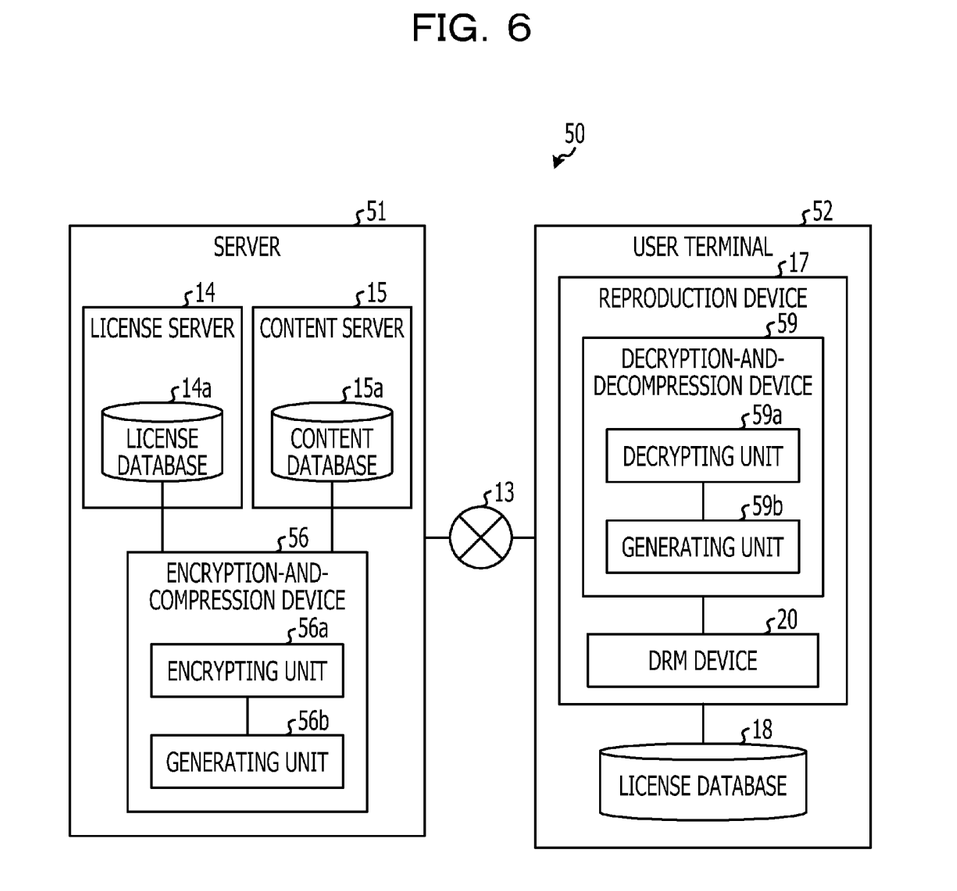
FIG. 6 illustrates one example of the configuration of a system.

FIG. 6 is a block diagram illustrating the configuration of a system according to a second embodiment. As illustrated in FIG. 6, a server 51 in a system 50 has an encryption-and-compression device 56 instead of the encryption-and-compression device 16 in the first embodiment. The encryption-and-compression device 56 is different from the encryption-and-compression device 16 in the first embodiment in that a encrypting unit 56a and a generating unit 56b are provided in place of the encrypting unit 16a and the generating unit 16b in the encryption-and-compression device 16. A user terminal 52 in the system 50 also has a decryption-and-decompression device 59 instead of the decryption-and-decompression device 19 in the first embodiment. The decryption-and-decompression device 59 is different from the decryption-and-decompression device 19 in the first embodiment in that a decrypting unit 59a and a generating unit 59b are provided in place of the decrypting unit 19a and the generating unit 19b in the decryption-and-decompression device 19. In the following description, elements and devices that realize substantially the same functions as those in the first embodiment are denoted by the same reference numerals as those used in FIG. 1, and descriptions thereof are not given hereinafter.

The encrypting unit 56a encrypts a first data segment of content data to be encrypted, on the basis of first key information. For example, upon receiving a content-supplying instruction from the user terminal 12 over the Internet 13, the encrypting unit 56a obtains, from a content database 15a, content data corresponding to content indicated by the instruction. The encrypting unit 56a also obtains, from a license database 14a, key information corresponding to the obtained content data.

Using the LZ78 data compression algorithm, the encrypting unit 56a compresses the content data, while generating a dynamic dictionary. For example, the encrypting unit 56a registers symbols of unregistered content data into the dynamic dictionary, compresses the content data by using the dynamic dictionary, and registers the compressed content data into a buffer included in the encryption-and-compression device 56.

The generating unit 56b performs processing as explained below. That is, the generating unit 56b calculates a hash value $X_1$ of the data in the dynamic dictionary. One example of a hash function used when the generating unit 56b generates the hash value is SHA-2. The length of the hash value generated by the generating unit 56a is, for example, 128 bits, 192 bits, or 256 bits. The hash function used when the first encrypting unit 56a generates the hash value is the same as a hash function used when the decryption-and-decompression device 59 (described below) generates the hash values. The generating unit 56b couples the hash value $X_1$ and content key information Kc to calculate a value $X_2$ ($=X_1+Kc$). Next, the generating unit 56b calculates a hash value X of the value $X_2$.

When the size of the buffer reaches a predetermined block length, the encrypting unit 56a retrieves the data (Block 1, the first data segment), output to the buffer, from the buffer and encrypts the retrieved data by using the hash value X as an encryption key. Examples of an algorithm for the encryption performed by the encrypting unit 56a include symmetry-key cryptography such as DES and AES. The predetermined block length is a unit for encryption. The predetermined block length may be, for example, 128 bits. The algorithm for the encryption performed by the encrypting unit 56a corresponds to an algorithm for decryption performed by the decryption-and-decompression device 59 (explained below). The encrypting unit 56a sends the encrypted data to a content server 15. The encrypting unit 56a may also transmit the encrypted data to the user terminal 52 over the Internet 13.

By using a predetermined algorithm, the generating unit 56b generates second key information on the basis of the dynamic dictionary and the content key information. As a result of unregistered ones of the symbols of the content data into the dynamic dictionary, the data in the dynamic dictionary is updated.

A description will now be given in conjunction with a specific example. Each time the dynamic dictionary is updated, the generating unit 56b performs processing as explained below. That is, the generating unit 56b calculates a hash value $X_1$ of the data in the dynamic dictionary. The generating unit 56b couples the hash value $X_1$ and the content key information Kc to calculate a value $X_2$ (=$X_1$+Kc). Next, the generating unit 56b calculates a hash value X of the value $X_2$. The hash value X generated by the generating unit 56b serves as an encryption key used when the encrypting unit 56a performs encryption. Also, since the generating unit 56b calculates the hash value X each time the predetermined block length of compressed data is generated, the value of the hash value X that the encrypting unit 56a uses as the encryption key varies dynamically.

On the basis of the second key information, the encrypting unit 56a encrypts a second data segment of the content data, the second data segment being different from the first data segment encrypted by the encrypting unit 56a. For example, the encrypting unit 56a encrypts the content data by using the LZ78 data compression algorithm and using, as an encryption key, the hash value X generated by the generating unit 56b.

A description will now be given in conjunction with a specific example. Using LZ78 as the data compression algorithm, the encrypting unit 56a compresses the content data, while generating a dynamic dictionary. For example, the encrypting unit 56a registers symbols of unregistered content data into the dynamic dictionary, compresses the content data by using the dynamic dictionary, and registers the compressed content data into a buffer included in the encryption-and-compression device 56.

When the size of the buffer reaches a predetermined block length, the encrypting unit 56a retrieves the data, output to the buffer, from the buffer and encrypts the retrieved data by using, as an encryption key, the hash value X generated by the generating unit 56b. The encrypting unit 56a may also send the encrypted data to the user terminal 52 over the Internet 13. In this case, the encrypting unit 56a repeatedly performs processing for transmitting the thus-encrypted data to the user terminal 52. The encryption key used when the encrypting unit 56a performs encryption varies dynamically in accordance with a content data segment to be encrypted. Thus, it is possible to reduce guessing of the key information, compared to a case in which the content data is encrypted with a single encryption key.

On the basis of the first key information (the content key information), the decrypting unit 59a decrypts the first data segment of the content data to be decrypted, the content data being transmitted from the server 51.

A description will now be given in conjunction with a specific example. That is, the generating unit 59b calculates a hash value $X_1$ of the data in the dynamic dictionary. One example of a hash function used when the generating unit 59b generates the hash value is SHA-2 used when the generating unit 56b and so on explained above generate the hash values. The generating unit 59b couples the hash value $X_1$ and the content key information Kc to calculate a value $X_2$ (=$X_1$+Kc). Next, the generating unit 59a calculates a hash value X of the value $X_2$. The value of the hash value X varies according to update of the dynamic dictionary. The decrypting unit 59a uses the hash value X as a decryption key to decrypt the block at the beginning of the received content data. The decrypting unit 59a then uses the dynamic dictionary to decompress the decrypted data and transmits the decompressed data to a DRM device 20.

By using a predetermined algorithm, the generating unit 59b generates the second key information on the basis of the first data segment and the first key information. For example, each time the dynamic dictionary is updated, by decompression using the LZ78 data compression algorithm, the generating unit 59b performs processing as explained below. The generating unit 59b calculates a hash value $X_1$ of the data in the dynamic dictionary. One example of a hash function used when the generating unit 59b generates the hash value is SHA-2 used when the encrypting unit 56a and so on explained above generate the hash values. The generating unit 59b couples the hash value $X_1$ and the content key information Kc to calculate a value $X_2$ (=$X_1$+Kc). Next, the generating unit 59b calculates a hash value X of the value $X_2$. The value of the hash value X varies according to update of the dynamic dictionary.

The decrypting unit 59a decrypts the second data segment on the basis of the second key information. For example, the decrypting unit 59a uses the hash value X, calculated by the generating unit 59b, as an encryption key to decrypt the block 2 of the received content data. The decrypting unit 59a then uses the dynamic dictionary to decompress the decrypted data and transmits the decompressed data to the DRM device 20.

Each of the encryption-and-compression device 56 and the decryption-and-decompression device 59 may include an integrated circuit, such as an ASIC (application specific integrated circuit) or FPGA (field programmable gate array). Each of the encryption-and-compression device 56 and the decryption-and-decompression device 59 may also include an electronic circuit, such as a CPU (central processing unit) or an MPU (micro processing unit).

Figure 7:
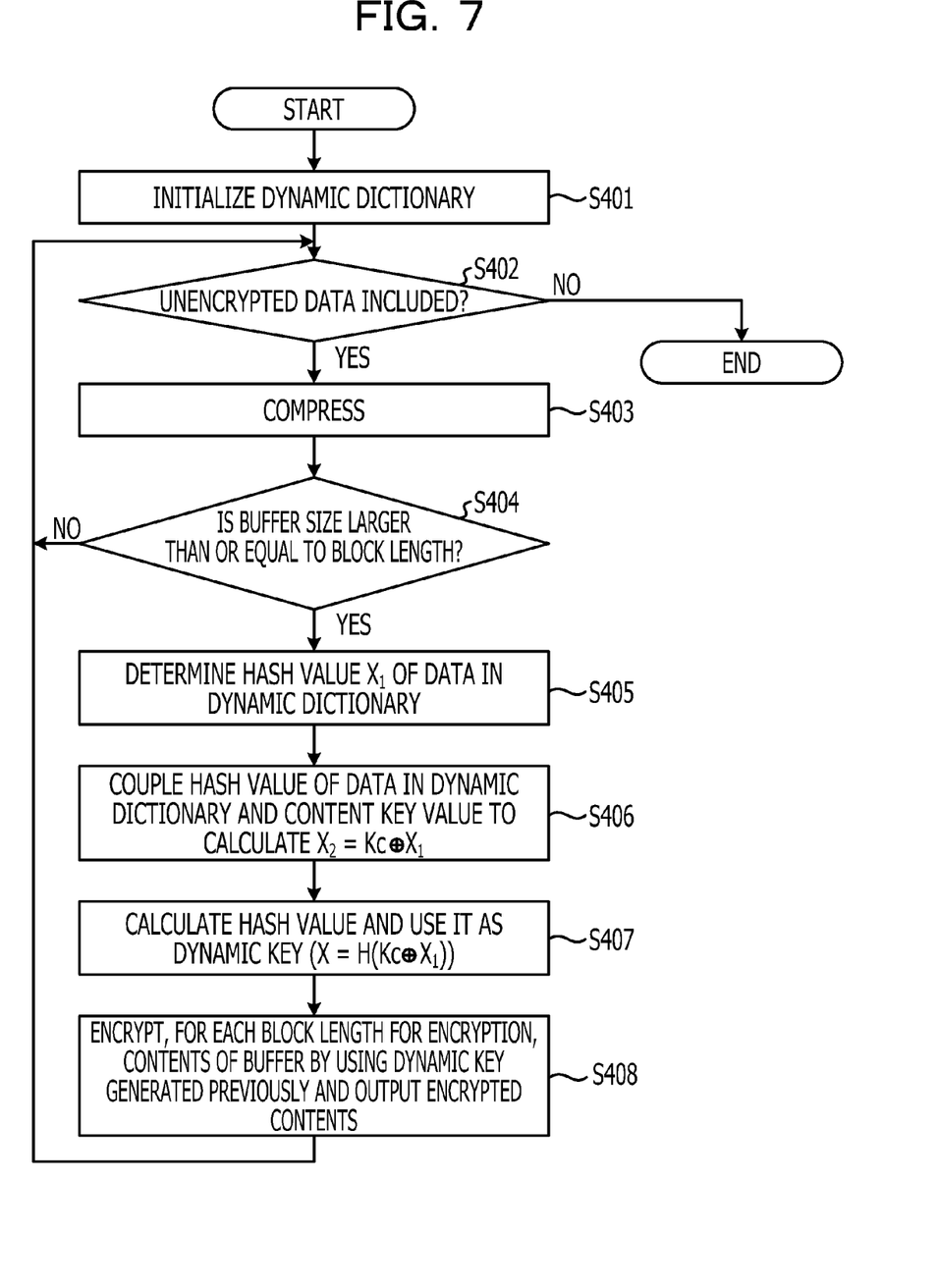
FIG. 7 illustrates a flowchart of compression-and-encryption processing.

A flow of the processing performed by the encryption-and-compression device 56 in the present embodiment will be explained next. FIG. 7 is a flowchart illustrating a procedure of compression-and-encryption processing according to the second embodiment. The compression-and-encryption processing may be executed at any appropriate timing. For example, the compression-and-decryption processing may be executed when the server 51 receives a content-supplying instruction. Since a flow of the processing performed by the system 50 according to the present embodiment is substantially the same as the processing in the first embodiment, a description thereof is not given hereinafter.

In S401 in FIG. 7, the encrypting unit 56a initializes the dynamic dictionary. In S402, the encrypting unit 56a determines whether or not unencrypted data is included in the obtained content data. When no unencrypted data is included (Negative in S402), the processing ends. On the other hand, when unencrypted data is included (Affirmative in S402), the encrypting unit 56a registers symbols of unregistered content data into the dynamic dictionary, compresses the content data by using the dynamic dictionary, and registers the compressed content data into the buffer included in the encryption-and-compression device 56 (S403).

In S404, the first encrypting unit 56a determines whether or not the size of the buffer is larger than or equal to a predetermined block length. When the size of the buffer is smaller than the predetermined block length (Negative in S404), the process returns to S402. On the other hand, when the size of the buffer is larger than or equal to the predetermined block length (Affirmative in S404), the generating unit 56a calculates a hash value X1 of the data in the dynamic dictionary. In S404, the generating unit 56a couples the hash value X1 and content key information Kc to calculate a value X2 (=X1+Kc). In S405, the generating unit 56a calculates a hash value X of the value X2.

the encrypting unit 56a retrieves the data, output to the buffer, from the buffer and encrypts the retrieved data by using the hash value X, which is generated previously in this flowchart (on the case of value X is not generated previously, the content key information), as an encryption key. In S408, the encrypting unit 56a sends the encrypted data to the content server 15. Thereafter, the process returns to S402. As a result of the processing described above, content data to be transmitted to the user terminal 12 is generated.

Figure 8:
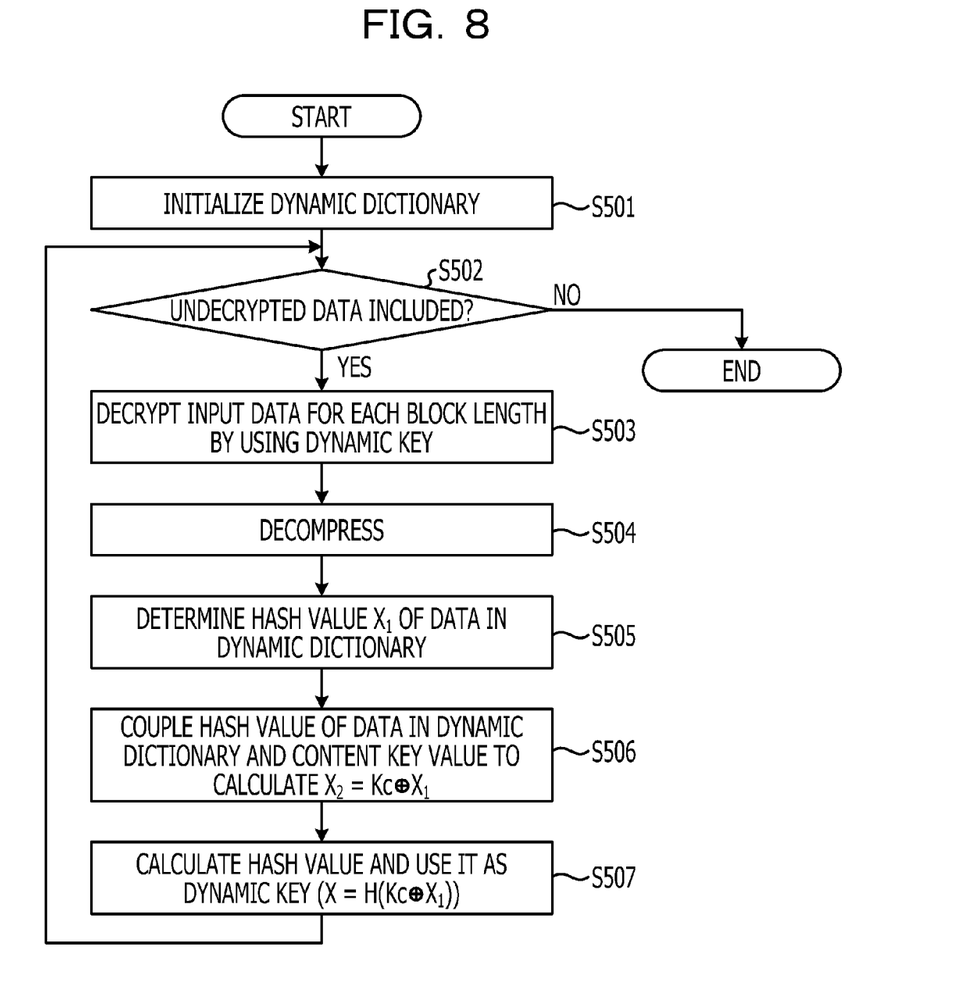
FIG. 8 illustrates a flowchart of decryption-and-decompression processing.

A flow of the processing performed by the decryption-and-decompression device 59 in the present embodiment will be explained next. FIG. 8 is a flowchart illustrating a procedure of decryption-and-decompression processing according to the second embodiment. The decryption-and-decompression processing may be executed at any appropriate timing. For example, the decryption-and-decompression may be executed when the user terminal 52 receives the content data.

In S501 in FIG. 8, the decrypting unit 59a initializes the dynamic dictionary. In S502, the encrypting unit 59a determines whether or not undecrypted data is included in the received content data. When no undecrypted data is included (Negative in S502), the processing ends. On the other hand, when undecrypted data is included (Affirmative in S502), the first decrypting unit 59a uses the hash value X (when the hash value X is not generated, the content key information) as a decryption key to decrypt an undecrypted block that is included in the received content data and that is the closest to the beginning of the content data (S503). In S504, the decrypting unit 59a uses the dynamic dictionary to decompress the decrypted data and transmits the decompressed data to the DRM device 20. In S509, the first decrypting unit 59a sets a next symbol of the content data as a processing target.

The generating unit 59b calculates a hash value X1 of the data in the dynamic dictionary (S505). In S506, the generating unit 59b couples the hash value X1 and the content key information Kc to calculate a value X2 (=X1+Kc). In S507, the generating unit 59b calculates a hash value X of the value X2. Thereafter, the process returns to S502.

As described above, on the basis of a first key information, the encryption-and-compression device 56 in the present embodiment encrypts a first data segment of data to be encrypted. On the basis of the first data segment and the first key information, the encryption-and-compression device 56 in the present embodiment generates second key information by using a predetermined algorithm. Subsequently, on the basis of the second key information, the encryption-and-compression device 56 in the present embodiment encrypts a second data segment of the data to be encrypted, the second data segment being different from the first data segment. As described above, the first key information and the second key information vary dynamically in accordance with a data segment of the content data to be encrypted. Thus, the encryption-and-compression device 56 in the present embodiment makes it possible to reduce guessing of the key information, compared to a case in which the content data is encrypted with a single encryption key.

The encryption-and-compression device 56 in the present embodiment also compresses the second data segment by using the dynamic dictionary and encrypts the compressed second data segment on the basis of the data in the dynamic dictionary and the key information determined according to the data to be encrypted. Accordingly, the encryption-and-compression device 56 in the present embodiment can perform the compression and the encryption by a single operation, thus making it possible to achieve efficient compression and encryption in terms of the amount of time and the amount of resource. For the same reason, the decryption-and-decompression device 59 in the present embodiment can perform the decompression and the decryption by a single operation, thus making it possible to achieve efficient decompression and decryption in terms of the amount of time and the amount of resource. Since the decryption-and-decompression device 59 in the present embodiment can perform the decompression and the decryption by a single operation, raw data can be locally decompressed and the risk of information leak can be reduced.

By using a predetermined algorithm, the encryption-and-compression device 56 in the present embodiment also generates third key information on the basis of a second data segment of the data to be encrypted and second key information. On the basis of the third key information, the encryption-and-compression device 56 in the present embodiment encrypts third data segment of the data to be encrypted. Accordingly, the encryption-and-compression device 56 in the present embodiment can encrypt the data with changing the pieces of key information corresponding to data segments (the positions thereof) of the data.

The decryption-and-decompression device 59 in the present embodiment also decrypts the first data segment on the basis of the first key information. On the basis of the first data segment and the first key information, the decryption-and-decompression device 59 in the present embodiment generates the second key information by using a predetermined algorithm. The decryption-and-decompression device 59 in the present embodiment then decrypts the second data segment on the basis of the second key information. Thus, the decryption-and-decompression device 59 in the present embodiment can decrypt the encrypted data of which guessing of the key information is reduced.

Although the embodiments of the devices disclosed herein have been explained above, the present technology may be realized in various forms other than those described in the particular embodiments. Other embodiments encompassed by the present technology will be explained below.

For example, all or part of the processing operations described above in the first and second embodiments as being automatically performed may also be performed manually. All or part of the processing operations described in the above-described embodiments as being manually performed may also be performed automatically by a known method.

The processing operations in the steps explained in each of the above embodiments may also be arbitrarily separated or combined according to various types of load and a usage state. One or more of the steps may also be omitted.

The order of the processing operations in the steps explained in each of the above embodiments may also be changed according to various loads and a usage state.

The elements of the devices explained above and illustrated in the accompanying drawings are merely functionally conceptual and may be physically configured differently from those illustrated. That is, specific forms of separation/integration of the devices are not limited to those illustrated, and all or a portion thereof may be functionally or physically separated or integrated in an arbitrary manner, depending on various loads and a usage state.

Figure 9:
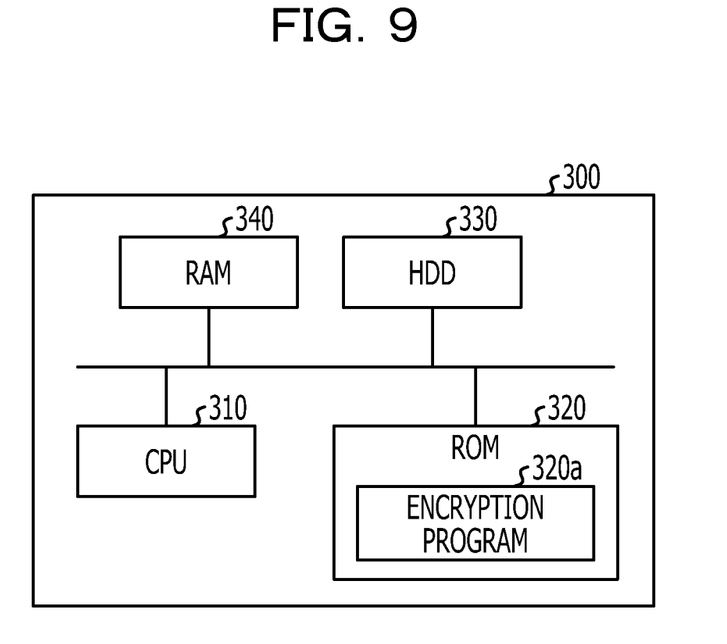
FIG. 9 illustrates a computer for executing an encryption program.
Figure 10:
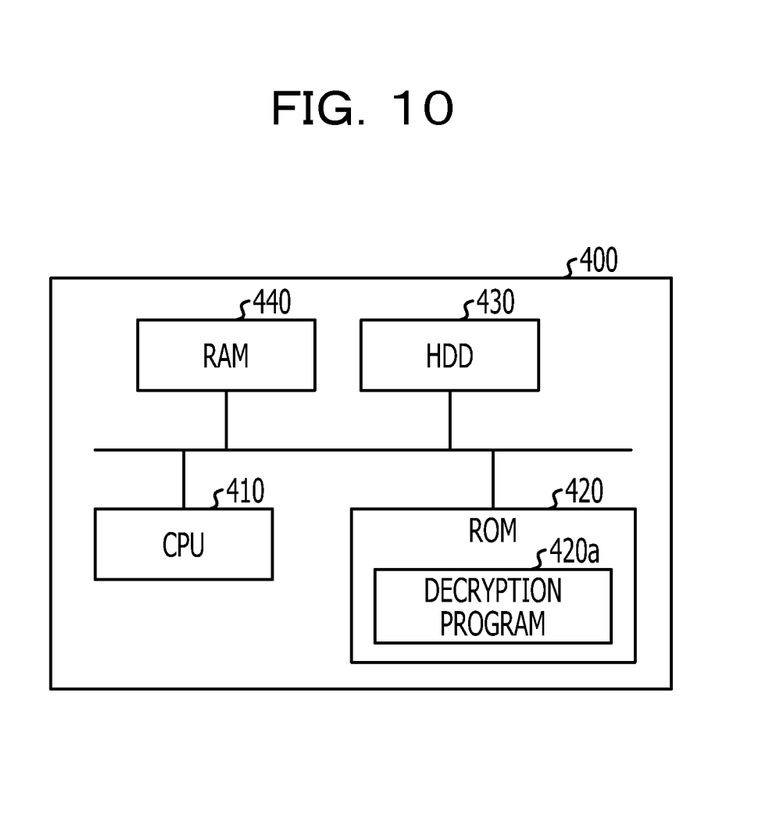
FIG. 10 illustrates a computer for executing a decryption program.

The various types of processing of the encryption-and-compression device and the decryption-and-decompression device according to the first and second embodiments explained above may be implemented by executing a predetermined program with a computer system, such as a personal computer or workstation. One example of a computer for executing an aid program having functions that are similar to those of the encryption-and-compression device and the decryption-and-decompression device according to the above-explained embodiments will now be explained with reference to FIGS. 9 and 10. FIG. 9 is a block diagram illustrating a computer for executing an encryption program. FIG. 10 is a block diagram illustrating a computer for executing a decryption program.

As illustrated in FIG. 9, a computer 300 includes a CPU (central processing unit) 310, a ROM (read only memory) 320, a HDD (hard disk drive) 330, a RAM (random access memory) 340, and a communication interface (not illustrated) for communication with an external network. Those elements are connected through a bus.

The ROM 320 pre-stores an encryption program 320a that offers functions similar to those of the first encrypting unit, the first generating unit, and the second encrypting unit in the above-explained embodiments. The encryption program 320a may be divided into multiple programs, as appropriate.

The CPU 310 reads the encryption program 320a from the ROM 320 and executes the encryption program 320a.

A license database and a content database may be stored in the HDD 330. The license database and the content database correspond to the license database 14a and the content database 15a.

The CPU 310 reads the license database and the content database and stores the read databases in the RAM 340. In addition, the CPU 310 uses the license database and the content database, stored in the RAM 340, to execute the encryption program 320a. With respect to data to be stored in the RAM 340, part of data may be stored in the RAM 340, for example, only data used for processing may be stored in the RAM 340.

As illustrated in FIG. 10, a computer 400 includes a CPU 410, a ROM 420, a HDD 430, and a RAM 440. Those elements 410 to 440 are connected through a bus.

The ROM 420 pre-stores a decryption program 420a that offers functions similar to those of the first decrypting unit, the second generating unit, and the second decrypting unit in the above-explained embodiments. The decryption program 420a may be divided into multiple programs, as appropriate.

The CPU 410 reads the decryption program 420a from the ROM 420 and executes the decryption program 420a.

A license database may be stored in the HDD 430. This license database corresponds to the license database 18.

The CPU 410 reads the license database and stores the read database in the RAM 440. In addition, the CPU 410 uses the license database, stored in the RAM 440, to execute the decryption program 420a.

The encryption program 320a and the decryption program 420a described above may be initially stored in media other than the ROMs 320 and 420.

For example, the encryption program 320a and the decryption program 420a may be stored in portable physical media inserted into computers. Examples of the portable physical media include a flexible disk (FD), a CD-ROM, a DVD (digital versatile disc), a magneto-optical disk, and an IC card. The computers may read the corresponding programs 320a and 420a from those media and execute the programs.

Additionally, each of the programs may be stored in another computer (e.g., a server) connected to the computers through an open network, the Internet, a LAN (local area network), or a WAN (wide area network). The computers may read the programs from the other computer and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory recording medium to store an encrypting program that causes a computer to execute a procedure, the procedure comprising:
   encrypting a first data segment of content data based on first key information and producing a corresponding first value;
   generating second key information by calculating a hash value of the first value based on the first data segment and the first key information, using a predetermined algorithm applying a sliding window to buffer data; and
   encrypting a second data segment of the content data having a second value, which is different from the first value of the first data segment, based on the second key information generated,
   wherein the sliding window is shifted by a predetermined block length and a hash value corresponding with an additional data segment is generated in accordance with the shift in the sliding window.

2. The recording medium according to claim 1, wherein the first data segment is compressed by a compression algorithm using a sliding window, and wherein the second key information is generated based on data in the slide window and the first key information.

3. The recording medium according to claim 1, wherein the first data segment is compressed by a compression algorithm using a dynamic dictionary, and wherein the second key information is generated based on data in the dynamic dictionary and the first key information.

4. The recording medium according to claim 1, the procedure comprising:
   generating third key information based on the second data segment and the second key information by using the predetermined algorithm; and
   encrypting a third data segment of the content data, which is different from both the first data segment and the second data segment, based on the third key information.

5. A computer-readable, non-transitory recording medium to store a decrypting program that causes a computer to execute a procedure, the procedure comprising:
   decrypting, using first key information, an encrypted first data segment of encrypted data encrypted based on the first key information;
   generating second key information for an encrypted second data segment of the encrypted data by calculating a hash value of a value associated with the decrypted first data segment and the first key information, using a predetermined algorithm applying a sliding window to buffer data; and
   decrypting the encrypted second data segment having a value different from the value of the first encrypted data segment based on the second key information generated,
   wherein the sliding window is shifted by a predetermined block length and a hash value corresponding with an additional data segment is generated in accordance with the shift in the sliding window.

6. The recording medium according to claim 5, the procedure comprising:
   decompressing the decrypted first data segment by a decompression algorithm using a slide window, wherein the second key information is generated based on data in the slide window and the first key information.

7. The recording medium according to claim 5, the procedure comprising:
   decompressing the decrypted first data segment by a decompression algorithm using a dynamic dictionary, wherein the second key information is generated based on data in the dynamic dictionary and the first key information.

8. The recording medium according to claim 5, wherein the encrypted data is encrypted with symmetric-key cryptography.

9. An encrypting method comprising:
   encrypting a first data segment of content data, based on first key information and producing a corresponding first value;
   generating, using a processor, second key information by calculating a hash value of the first value based on the first data segment and the first key information, using a predetermined algorithm applying a sliding window to buffer data; and
   encrypting a second data segment of the content data having a value which is different from the first value of the first data segment, based on the second key information generated,
   wherein the sliding window is shifted by a predetermined block length and a hash value corresponding with an additional data segment is generated in accordance with the shift in the sliding window.

10. A decrypting method comprising:
    decrypting an encrypted first data segment of encrypted data encrypted based on first key information;
    generating, by a processor, second key information by calculating a hash value of a value associated with the decrypted first data segment and the first key information, using a predetermined algorithm applying a sliding window; and
    decrypting the encrypted second data segment having a value different from the value of the encrypted first data segment, based on the second key information generated,
    wherein the sliding window is shifted by a predetermined block length and a hash value corresponding with an additional data segment is generated in accordance with the shift in the sliding window.

11. A decrypting apparatus comprising:
    a memory that stores encrypted data, which includes an encrypted first data segment encrypted based on first key information and an encrypted second data segment encrypted based on second key information; and
    a processor that executes the procedure, the procedure including:
      decrypting the encrypted first data segment;
      generating the second key information by calculating a hash value of a value associated with the decrypted first data segment and the first key information, using a predetermined algorithm applying a sliding window; and
      decrypting the encrypted second data segment having a value different from the value of the encrypted first data segment based on the second key information generated,
    wherein the sliding window is shifted by a predetermined block length and a hash value corresponding with an additional data segment is generated in accordance with the shift in the sliding window.

12. A server apparatus comprising:
    a memory that stores an encrypted content file encrypted by a procedure, the procedure includes:
      encrypting a first data segment of a content file based on first key information and producing a corresponding first value;
      generating second key information by calculating a hash value of the first value based on the first data segment and the first key information, using a predetermined algorithm applying a sliding window; and
      encrypting a second data segment of the encryption target data having a second value, which is different from the first value of first data segment, based on the second key information generated; and
    a processor that supplies the encrypted content file to a terminal device upon an obtain request from the terminal device that decrypts a file by another procedure, the procedure includes:
      decrypting the encrypted first data segment;
      generating the second key information by calculating a hash value of a value associated with the decrypted first data segment by the predetermined algorithm; and
      decrypting the encrypted second data segment based on the second key information generated,
    wherein the sliding window is shifted by a predetermined block length and a hash value corresponding with an additional data segment is generated in accordance with the shift in the sliding window.

13. The encrypting method according to claim 9, wherein the first data segment is compressed by a compression algorithm using a sliding window, and wherein the second key information is generated based on data in the sliding window and the first key information.

14. The encrypting method according to claim 9, wherein the first data segment is compressed by a compression algorithm using a dynamic dictionary, and wherein the second key information is generated based on data in the dynamic dictionary and the first key information.

15. The encrypting method according to claim 9, further comprising:
    generating third key information based on the second data segment and the second key information by using the predetermined algorithm; and
    encrypting a third data segment of the content data, which is different from both the first data segment and the second data segment, based on the third key information.

16. The decrypting method according to claim 10, further comprising:
    decompressing the decrypted first data segment by a decompression algorithm using a sliding window, wherein the second key information is generated based on data in the sliding window and the first key information.

17. The decrypting method according to claim 10, further comprising:
    decompressing the decrypted first data segment by a decompression algorithm using a dynamic dictionary, wherein the second key information is generated based on data in the dynamic dictionary and the first key information.

18. The decrypting method according to claim 10, wherein the encrypted data is encrypted with symmetric-key cryptography.

* * * * *